SUSPENSION SYSTEM FOR AN AUTOMATIC WASHER

Original Filed April 14, 1958 4 Sheets-Sheet 1

Inventors:
Curtis E. Behrens and
Robert D. Shapter
By: W. S. McCurry Atty.

SUSPENSION SYSTEM FOR AN AUTOMATIC WASHER

Original Filed April 14, 1958 4 Sheets-Sheet 2

Inventors:
Curtis E. Behrens and
Robert D. Shapter
By: W. S. McCurry Atty.

SUSPENSION SYSTEM FOR AN AUTOMATIC WASHER

Original Filed April 14, 1958 4 Sheets-Sheet 3

Inventors:
Curtis E. Behrens and
Robert D. Shapter
By: W. S. McCurry Atty.

SUSPENSION SYSTEM FOR AN AUTOMATIC WASHER

Original Filed April 14, 1958 4 Sheets-Sheet 4

Inventors:
Curtis E. Behrens and
Robert D. Shapter
By: W. S. McCurry Atty.

United States Patent Office

Re. 25,693
Reissued Dec. 1, 1964

25,693
SUSPENSION SYSTEM FOR AN AUTOMATIC WASHER

Curtis E. Behrens, Effingham, Ill., and Robert D. Shapter, North Muskegon, Mich., assignors to Borg-Warner Corporation, Chicago, Ill., a corporation of Illinois Original No. 2,978,892, dated Apr. 11, 1961, Ser. No. 728,321, Apr. 14, 1958. Application for reissue May 7, 1962, Ser. No. 196,841
1 Claim. (Cl. 68—24)

Matter enclosed in heavy brackets [ ] appears in the original patent but forms no part of this reissue specification; matter printed in italics indicates the additions made by reissue.

The present invention relates to clothes washing machines or the like and more particularly to a clothes washing machine of the type having a horizontal basket disposed within a horizontal tub and adapted to be driven at a relatively slow speed for washing the clothes and at a relatively high speed for extracting water from the clothes.

In clothes washing machines of this type, the tub is subjected to various unbalanced forces and vibrations due primarily to the uneven distribution of clothes in the rotating basket. These movements of the tub occur throughout the washing and extraction periods but are the greatest at or near the critical speed, that is, that speed between the slow washing speed and the high extraction speed when the vibrations are in resonance with the natural frequency of the tub. While the vibrations and oscillations are in all directions, the horizontal vibrations are those which cause the clothes washing machine to "creep" about the floor on its feet.

It is therefore an object of the present invention to isolate the horizontal forces and prevent the machine from "creeping." This object is accomplished by pivotally suspending the tub of the washing machine on a base structure in the manner of an inverted pendulum to allow movement of the tub in a horizontal arc but preventing movement of the tub vertically with respect to the base structure. Tension springs are connected to the tub and the base structure at either side of the pivotal mounting to give lateral stiffness to resist the deflections of the tub during slow speed washing and to resist the torque reactions of the tub horizontally when the speed of the basket is accelerated from slow speed wash to high speed extraction. A friction pad is placed between the tub and its base to provide friction damping for the tub.

The springs are also utilized to adjust the natural frequency of the system. It has been found that by adjusting the springs to give a natural frequency of 50 cycles per minute to the system that no uncontrolled vibrations occur in going from slow wash speed to high extraction speed. It has also been found that low natural frequencies on the order of 10–30 cycles per minute improve vibration isolation but when the springs are so adjusted, and with the friction pad engaged, there is insufficient centering effect by the springs on the tub. To adjust the natural frequency at some value above the low wash speed (50 cycles or revolutions per minute) causes complications which have plagued the horizontal type vibration-isolated washing machine since its inception. In prior machines, the rotating cylinder must pass through the critical speed or natural frequency speed when accelerating from the low wash speed to the high extraction speed. Thus, horizontal axis washers that permit vertical movement of the tub must, for practical reasons, have the natural frequency at about 110 cycles per minute minimum. If the natural frequency is lower, the deflection of the tub is so great that the tub will drop several inches in the cabinet when the clothes load and the water are added. The higher the critical speed, the greater are the problems encountered. Vibration isolation itself improves as the ratio of the spin speed to the critical speed increases or to state it differently, with a given spin speed, the lower the critical speed or natural frequency speed, the better the isolation. A critical speed of approximately 110 revolutions per minute is sufficiently high enough to cause centrifugal forces due primarily to unbalanced clothes loads that will result in uncontrolled movements of large amplitude of the tub. It is for this reason that the present washing machine has its natural frequency adjusted to about 50 cycles per minute.

It has been the practice in the past to suspend the tub on superstructure within the cabinet for the machine. It is another object of the present invention to eliminate such methods of suspension and to support the tub solely on a base support structure. By the use of such a mounting system, no bulky framework is required nor is there any stress on the cabinet. Also, the metal requirements for the cabinet covering the tub are materially reduced. The present design also permits operation of the machine without a cabinet, making the unit quite adaptable to built-in installations.

The above and other objects of the invention will appear more fully from the following description and by reference to the accompanying drawings forming a part hereof and wherein.

Figure 1:
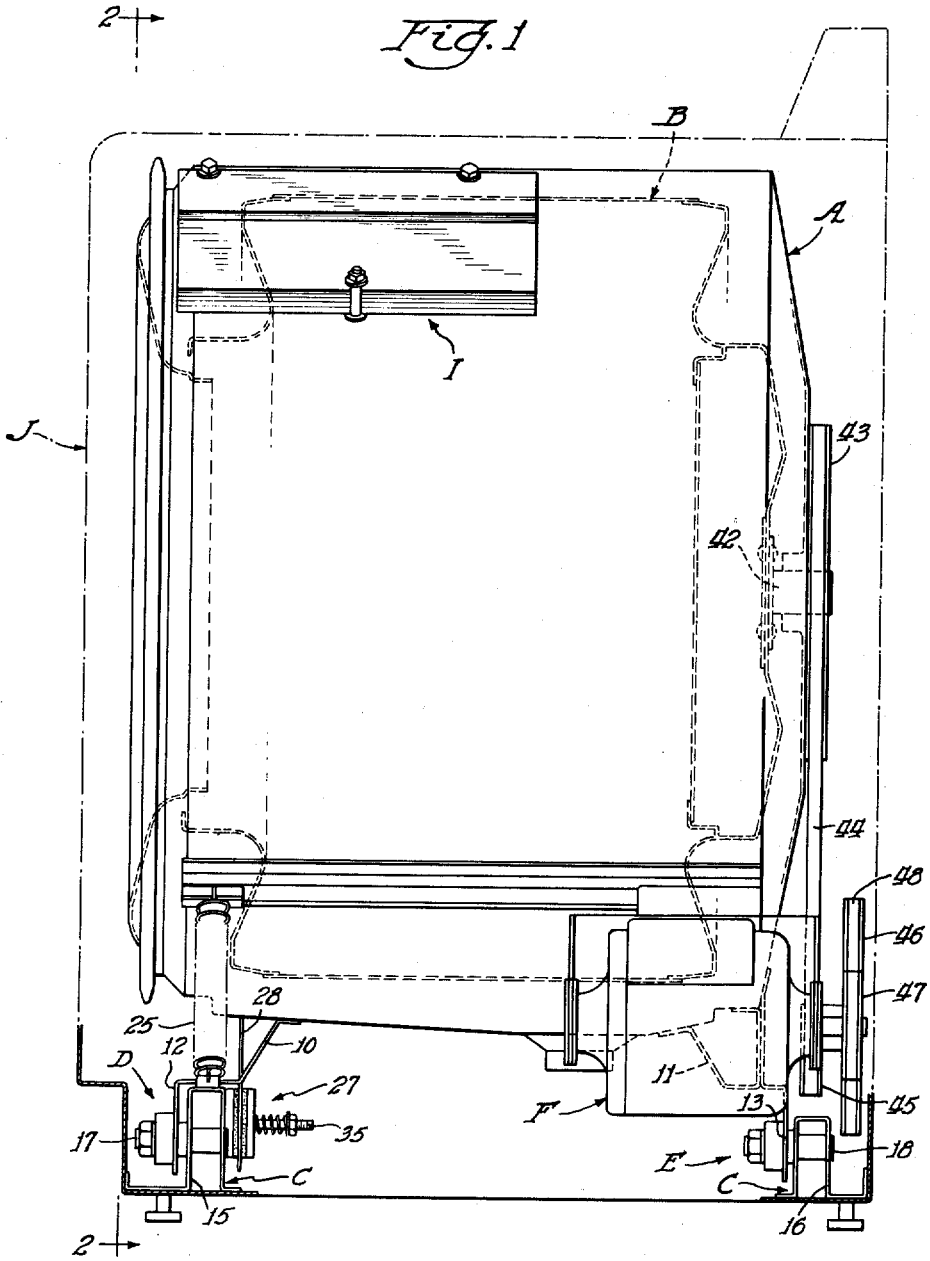
FIG. 1 is a sectional view of the washing machine of the present invention.
Figure 2:
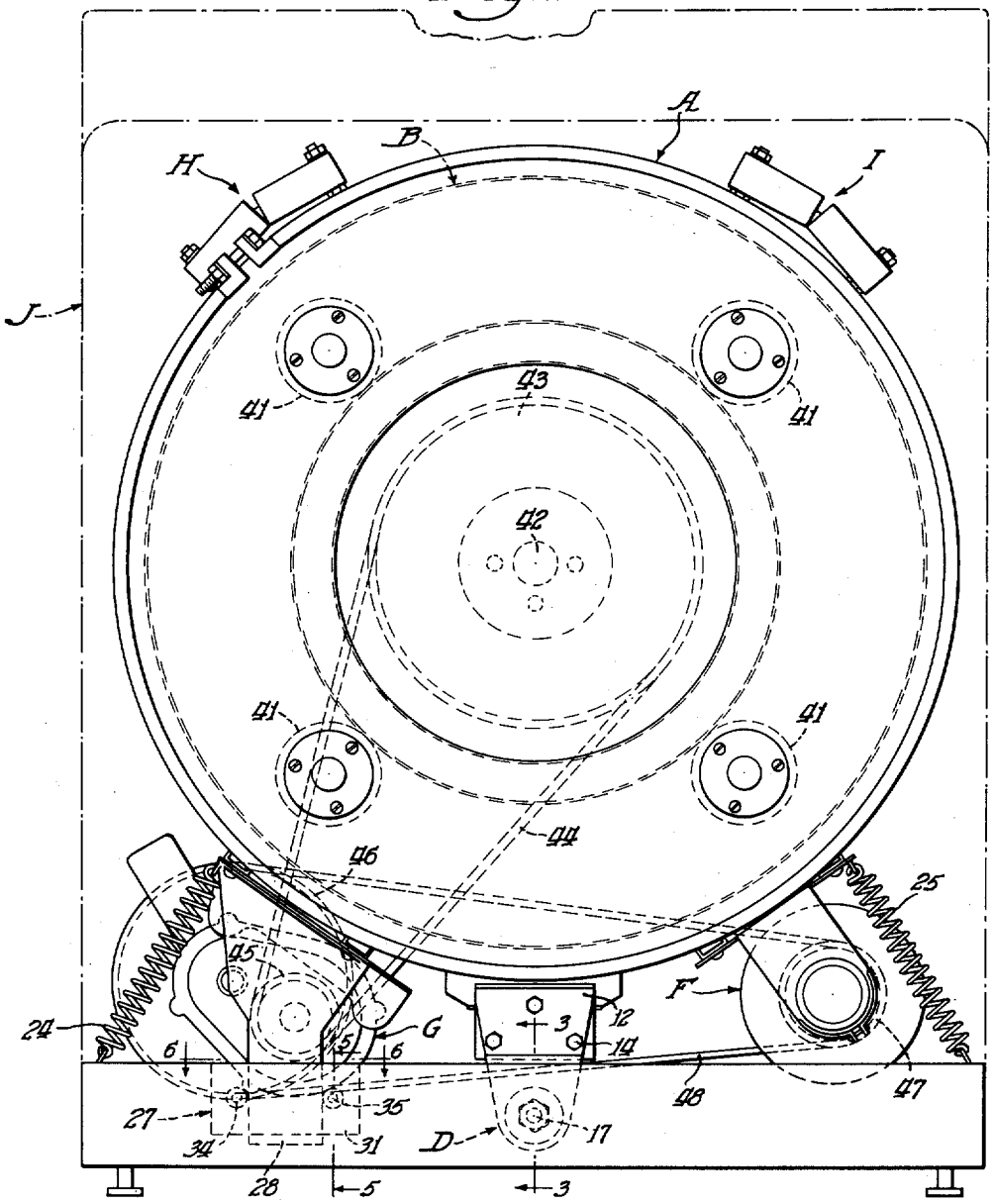
FIG. 2 is a front view taken on the lines 2—2 of FIG. 1.
Figure 3:
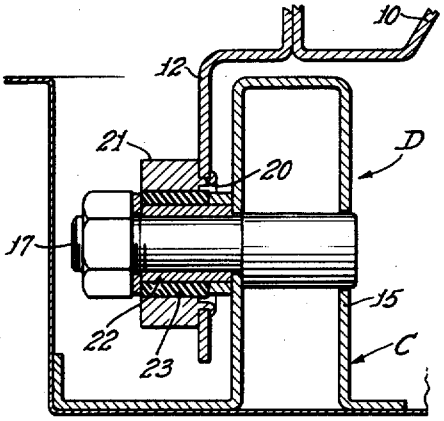
FIG. 3 is a cross-sectional view taken on line 3—3 of FIG. 2 and showing the front pivot for the tub of the washing machine.
Figure 4:
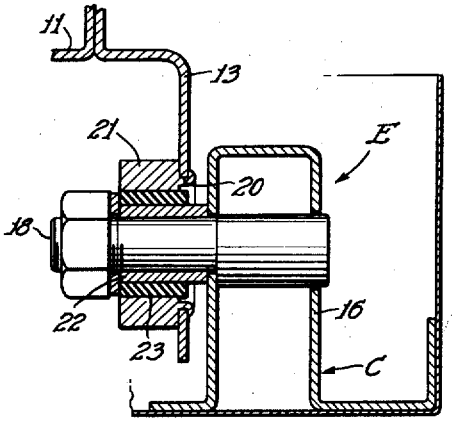
FIG. 4 is a cross-sectional view showing the rear pivot for the tub.
Figure 6:
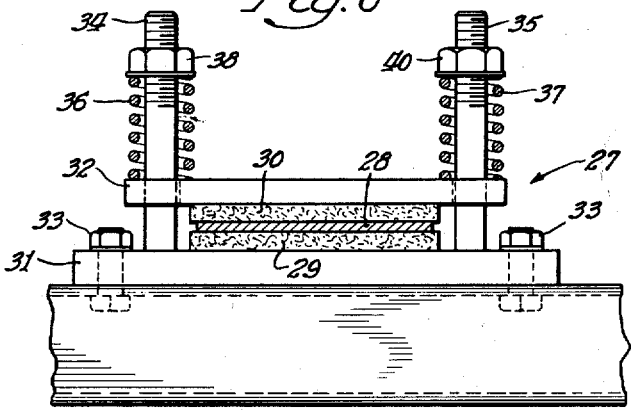
FIG. 6 is a cross-sectional view taken on line 6—6 of FIG. 2.
Figure 5:
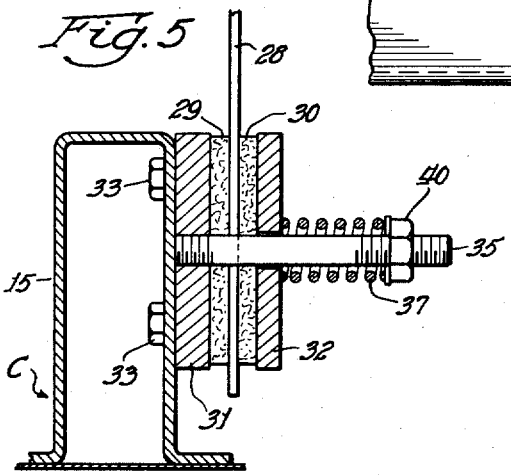
FIG. 5 is a cross-sectional view taken on line 5—5 of FIG. 2 and showing a vibration dampener used in the present machine.

Referring to the drawings, there is disclosed a horizontal washing machine comprising in general an imperforate tub A, a perforate clothes receiving cylinder or basket B adapted to be rotatably disposed within the tub A, a supporting base structure C, pivots D and E for attaching the tub A to the base structure, an electric motor F attached to and suspended from one side of said tub, a two-speed transmission G attached to and suspended from the other side of said tub, a pair of weights H and I for adding weight to the assembly to provide inertia damping, and a housing or casing J for enclosing the aforementioned structure.

The pivots D and E are provided directly below the center of the tub A. A pair of front and rear brackets 10 and 11 are suitably secured to the bottom of the tub A. Plates 12 and 13 are fastened respectively by means of bolts 14 to the brackets 10 and 11. The base structure C has upstanding channel members 15 and 16 and the plates 12 and 13 are secured to channel members 15 and 16, respectively, by means of bolts 17 and 18. Each of the plates 12 and 13 has an opening 20 therein and a bushing 21 is mounted in this opening. In order to provide for movement of the tub A relative to the base structure C, a bearing sleeve 22 surrounds bolts 17 and 18 and in order to provide a resilient pivot, a rubber sleeve 23 is disposed between the bearing sleeve 22 and the bushing 21.

A pair of springs 24 and 25 are provided on opposite sides of the pivot D and the ends of the springs are attached to the tub A and the base structure C. The springs are required to give sufficient lateral stiffness to resist the deflections of the tub caused by the tumbling clothes load (slow speed) and the torque reactions caused by the acceleration of the cylinder from the low speed wash cycle to the high speed spin cycle, and also provides a centering force for the tub and are further utilized for determining the natural frequency of the system. As before pointed out, the pivots D and E permit relative movement of the tub A with respect to the base C and since the pivots are the only support for the tub A, the tub is suspended in the manner of an inverted pendulum. The springs 24 and 25 raise the natural frequency of the pendulum due to the additional restoring force so that the pendulum must be lengthened to return the natural frequency of the system to the desired value. The counterbalance weights H and I increase the weight of the tub assembly, improving isolation by reducing the amplitude of vibration.

In addition to the use of the springs 24 and 25 to resist the deflections of the tub A caused by the tumbling clothes load during the low speed wash cycle, there is provided a vibration dampener indicated generally by the reference numeral 27. The vibration dampener 27 comprises an arm 28 fixedly secured to and depending from the tub A and engaging a pair of friction pads 29 and 30 fixed by means of plates 31 and 32 to the supporting base structure C. The plate 31 is fixed to the channel member 15 by means of a plurality of bolts 33 and the plate 32 is spring pressed against the friction pads and the plate 31 by means of bolts 34 and 35 having associated therewith springs 36 and 37. Nuts 38 and 40 engage the springs 36 and 37 and are tightened on the bolts 34 and 35 to adjust the engagement of the pads 29 and 30 against the arm 28.

The clothes receiving cylinder or basket B is adapted to be rotated at a slow speed (approximately 50 r.p.m.) for tumbling the clothes during the wash cycle of the machine and at a high speed (approximately 200 r.p.m. as above) during the water extraction cycle. The electric motor F and the two speed transmission G have suitable connections with the basket B for providing these two basket speeds. The basket B is rotatably supported on the tub A at the front thereof by means of a plurality of rollers 41 and at the rear thereof by means of a rotatable shaft 42. A pulley 43 is fixedly secured to the shaft 42 and a belt 44 is connected between the pulley 43 and a transmission output pulley 45. A transmission input pulley 46 is connected to an electric motor output pulley 47 by means of a driving belt 48.

In operation, a load of clothes is placed in the basket B and sufficient water is placed in the tub A as is the usual practice; suitable switch means (not shown) are actuated to energize the electric motor F and the basket is rotated at slow speed to tumble the clothes. The tub A will tend to deflect horizontally but will be restrained due to the vibration dampener 27 and the springs 24 and 25. In the event the tub does deflect horizontally, the springs 24 and 25 will restore the tub to its upright position. After the clothes have been washed by slow speed tumbling, the transmission is shifted to its high speed position by suitable means (not shown) to extract the water from the clothes. When the transmission is shifted from low speed to high speed and as the basket accelerates in speed, the tub A will tend to deflect horizontally but again as in tumbling speed the springs 24 and 25 and the vibration dampener 27 will provide sufficient lateral stiffness and resistance to resist the deflections of the tub.

Figure 7:
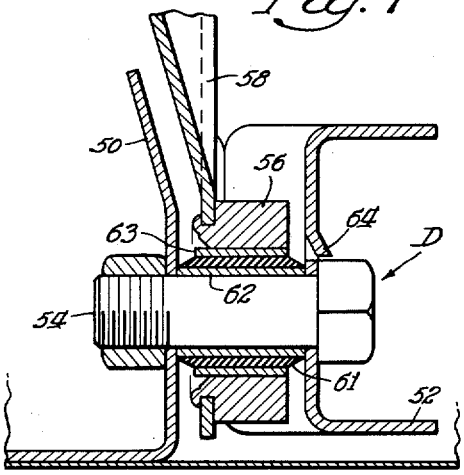
FIG. 7 is a cross-sectional view of a modified form of front pivot for the tub.
Figure 8:
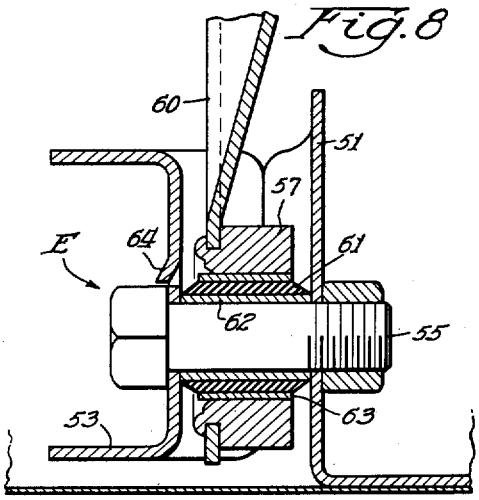
FIG. 8 is a cross-sectional view of a modified form of rear pivot.

A modified form of base structure and pivot means are shown in FIGS. 7 and 8. L-shaped frame members 50 and 51 have attached thereto and spaced therefrom at the area of the pivots D and E channel members 52 and 53. The channel members 52 and 53 and the frame members 50 and 51 are provided with aligned openings for receiving bolts 54 and 55. Bushings 56 and 57 are provided in plates 58 and 60 and a rubber sleeve 61 is mounted between bearing sleeves 62 and 63. A portion is struck out of the channel members 52 and 53 adjacent the bolt receiving openings to provide a bolt lock 64.

Figure 9:
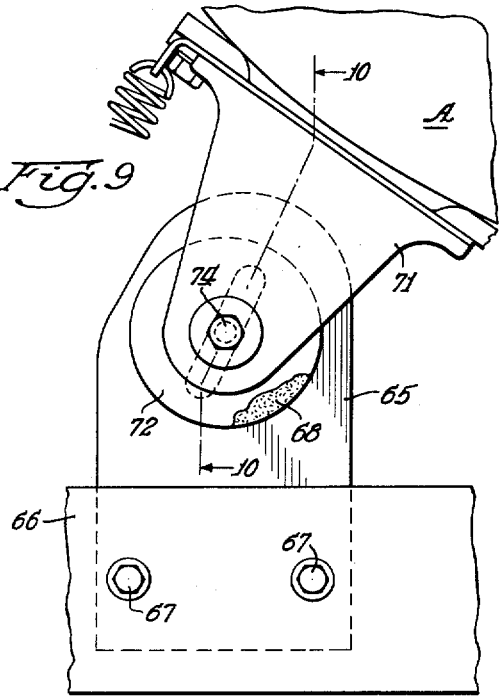
FIG. 9 is a plan view of a modified form dampener mechanism.
Figure 10:
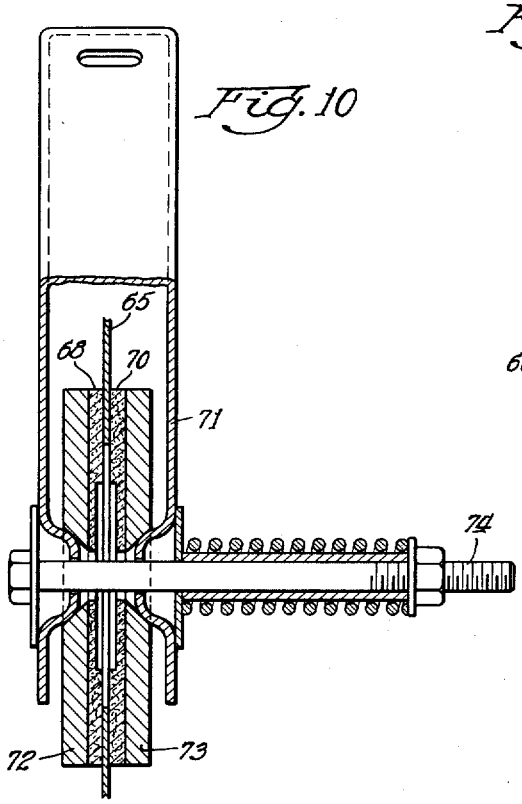
FIG. 10 is a cross-sectional view taken on line 10—10 of FIG. 9.

A modified form of vibration dampener is shown in FIGS. 9 and 10. This dampener comprises, in general, a stationary plate, or arm 65 attached to a frame member 66 by means of bolts 67 and a pair of friction pads 68 and 70 straddling the plate 65 and fixedly secured to the tub A by means of a bifurcated support 71. The pads 68 and 70 are urged against the arm 65 through plates 72, 73 and a spring loaded bolt 74.

While [we have described our invention] *the invention has been described* with specific embodiments thereof, it is to be understood that this is by way of illustration and not by way of limitation and the scope of [our] *the* invention is defined solely by the appended claims which should be construed as broadly as the prior art will permit.

[We claim] *The invention is hereby claimed as follows:*

[1. In a clothes washing machine, adapted to have a washing period and an extraction period, a tub, a basket journalled in said tub for rotation about a horizontal axis, a base structure, means for rotating said basket at a low speed during the washing period and at a high speed during the extraction period, means for solely supporting said tub and basket on said base structure, said means comprising pivot means on the bottom of said tub beneath the center of said tub for attaching said tub to the base structure, and means on opposite sides of said pivot and attached to said tub and said base structure to resist deflections of said tub in a horizontal direction.]

[2. In a clothes washing machine, adapted to have a washing period and an extraction period, a tub, a basket journalled in said tub for rotation about a horizontal axis, a base structure, means for rotating said basket at a low speed during the washing period and at a high speed during the extraction period, means for solely supporting said tub and basket on said base structure, said means comprising pivot means on the bottom of said tub beneath the center of said tub for attaching said tub to the base structure, and spring means on opposite sides of said pivot and attached to said tub and said base structure to resist deflections of said tub in a horizontal direction.]

3. In a clothes washing machine, adapted to have a washing period and an extraction period, a tub, a basket journalled in said tub for rotation about a horizontal axis, a base structure, means for rotating said basket at a low speed during the washing period and at a high speed during the extraction period, means for solely supporting said tub and basket on said base structure, said means comprising pivot means on the bottom of said tub beneath the center of said tub for attaching said tub to the base structure, and means on opposite sides of said pivot and attached to said tub and said base structure to resist deflections of said tub in a horizontal direction *and to adjust the natural pivot frequency of the tub about said pivot means to a value substantially equal to said low wash speed,* said last named means including springs attached to the bottom of said tub at opposite sides of said pivot to said base structure and a vibration dampener operatively positioned between the tub and base structure.

[4. In a clothes washing machine, adapted to have a washing period and an extraction period, a tub, a basket journalled in said tub for rotation about a horizontal axis, a base structure, means for rotating said basket at a low speed during the washing period and at a high speed during the extraction period, means for solely supporting said tub and basket on said base structure, said means comprising pivot means on the bottom of said tub beneath the center of said tub for attaching said tub to the base structure, and means for controlling the amplitude of vibration of said tub at substantially said low speed.]

[5. In a clothes washing machine, adapted to have a washing period and an extraction period, a tub, a basket journalled in said tub for rotation about a horizontal axis, a base structure, means for rotating said basket at about 50 cycles per minute for the washing period and at above about 175 cycles per minutes for the extraction period, means for solely supporting said tub and basket on said base structure, said means comprising a pendulum system having pivot means on the bottom of said tub beneath the center of said tub for attaching said tub to the base structure, and means for adjusting the amplitude of vibration of said tub natural frequency of said pendulum system to about 50 cycles per minute.]

[6. In a clothes washing machine, adapted to have a washing period and an extraction period, a tub, a basket journalled in said tub for rotation about a horizontal axis, a base structure, means for rotating said basket at a low speed during the washing period and at a high speed during the extraction period, means for solely supporting said tub and basket on said base structure, said means comprising pivot means on the bottom of said tub beneath the center of said tub for attaching said tub to the base structure, and means for adjusting the amplitude of vibration of said tub.]

[7. In a clothes washing machine, adapted to have a washing period and an extraction period, a tub, a basket journalled in said tub for rotation about a horizontal axis, a base structure, means for rotating said basket at a low speed during the washing period and at a high speed during the extraction period, means for solely supporting said tub and basket on said base structure, said means comprising pivot means on the bottom of said tub beneath the center of said tub for attaching said tub to the base structure, and means for adjusting the amplitude of vibration of said tub, said last named means including weights on the top of said tub at substantially the most distant point from said pivot means.]

References Cited by the Examiner

The following references, cited by the Examiner, are of record in the patented file of this patent or the original patent.

UNITED STATES PATENTS

| | | | |
|---|---|---|---|
| 2,311,545 | 2/43 | Hurley et al. | |
| 2,526,048 | 10/50 | Russell | 68—24 |
| 2,652,710 | 9/53 | De Remer | 68—23 |
| 2,692,681 | 10/54 | Douglas | 68—24 X |
| 2,813,415 | 11/57 | Clark | 68—24 X |

FOREIGN PATENTS

| | | |
|---|---|---|
| 1,106,055 | 7/55 | France. |

WALTER A. SCHEEL, *Primary Examiner.*

CHARLES A. WILLMUTH, *Examiner.*